(12) United States Patent
de Swardt et al.

(10) Patent No.: US 11,962,205 B2
(45) Date of Patent: Apr. 16, 2024

(54) MECHANICAL STRENGTH OF CONNECTION OF WOUND ROTOR GENERATOR/MOTOR

(71) Applicant: The Timken Company, North Canton, OH (US)

(72) Inventors: Jan de Swardt, Eustis, FL (US); Randall W. Russell, Kennewick, WA (US); Nathaniel Z. N. Glessner, Pasco, WA (US)

(73) Assignee: The Timken Company, North Canton, OH (US)

( * ) Notice: Subject to any disclaimer, the term of this patent is extended or adjusted under 35 U.S.C. 154(b) by 29 days.

(21) Appl. No.: 17/693,195

(22) Filed: Mar. 11, 2022

(65) Prior Publication Data

US 2022/0302802 A1    Sep. 22, 2022

Related U.S. Application Data

(60) Provisional application No. 63/161,667, filed on Mar. 16, 2021.

(51) Int. Cl.
*H02K 15/02* (2006.01)
*H02K 1/18* (2006.01)

(52) U.S. Cl.
CPC .......... *H02K 15/028* (2013.01); *H02K 1/185* (2013.01)

(58) Field of Classification Search
CPC .. H02K 15/028; H02K 1/185; H02K 15/0081; H02K 15/0006
See application file for complete search history.

(56) References Cited

U.S. PATENT DOCUMENTS

| | | | | |
|---|---|---|---|---|
| 1,671,488 | A * | 5/1928 | Rudenberg | H02K 17/18 310/212 |
| 3,601,646 | A * | 8/1971 | Balke | H02K 3/51 310/270 |
| 5,777,406 | A * | 7/1998 | Bomba | H02K 3/22 310/59 |
| 6,865,796 | B1 * | 3/2005 | Oohashi | H02K 3/12 242/432 |
| 7,002,278 | B2 * | 2/2006 | Verbanic | H02K 3/505 310/260 |
| 7,061,149 | B2 | 6/2006 | Crane | |
| 7,086,137 | B2 | 8/2006 | Tornquist et al. | |

(Continued)

*Primary Examiner* — Jeffrey T Carley
*Assistant Examiner* — Jose K Abraham
(74) *Attorney, Agent, or Firm* — Michael Best & Friedrich LLP

(57) ABSTRACT

A refurbished rotor of a wound rotor machine. The refurbished rotor includes a plurality of windings assembled to the rotor core, each manufactured from two separate bars: a top coil and a bottom coil. The top coil is positioned in a rotor core slot at a position radially outward of a position of the bottom coil within another rotor core slot. Each top coil and each bottom coil has a flat rectangular cross-section. On a connection end of the rotor where rotor leads are attached, the top coil has a flat end positioned alongside and in alignment with a flat end of the bottom coil of an adjacent one of the plurality of windings. The top coil and the bottom coil have respective flat ends joined to each other on a non-connection end of the rotor opposite the connection end by a joint for establishing electrical continuity.

9 Claims, 18 Drawing Sheets

(56) References Cited

U.S. PATENT DOCUMENTS

| | | | |
|---|---|---|---|
| 9,225,217 B2 | 12/2015 | Tomita et al. | |
| 10,038,357 B2 | 7/2018 | Neumann et al. | |
| 10,107,256 B2 | 10/2018 | Neumann et al. | |
| 10,177,621 B2 | 1/2019 | Kunihiro | |
| 10,658,898 B2 | 5/2020 | Hayasaka et al. | |
| 2003/0159269 A1* | 8/2003 | Lenoir | H02K 15/0081 |
| | | | 29/598 |
| 2005/0012423 A1* | 1/2005 | Yasuhara | H02K 3/12 |
| | | | 310/201 |
| 2007/0071612 A1* | 3/2007 | Yuratich | H02K 1/30 |
| | | | 417/423.7 |
| 2007/0096571 A1* | 5/2007 | Yuratich | E21B 43/128 |
| | | | 310/90 |
| 2011/0285227 A1* | 11/2011 | Kimiabeigi | H02K 3/12 |
| | | | 310/71 |
| 2017/0033629 A1* | 2/2017 | Haldemann | H02K 15/0414 |
| 2017/0047803 A1* | 2/2017 | Scherer | H02K 15/0018 |
| 2017/0279324 A1* | 9/2017 | Röer | H02K 3/28 |
| 2019/0280542 A1* | 9/2019 | Kawanami | H01R 43/0228 |
| 2020/0212769 A1* | 7/2020 | Tani | H02K 15/0006 |
| 2020/0274416 A1* | 8/2020 | Wrighton | H02K 5/132 |
| 2021/0006105 A1* | 1/2021 | Feustel | H02K 3/487 |
| 2021/0075300 A1* | 3/2021 | Meinekat | H02K 1/20 |

* cited by examiner

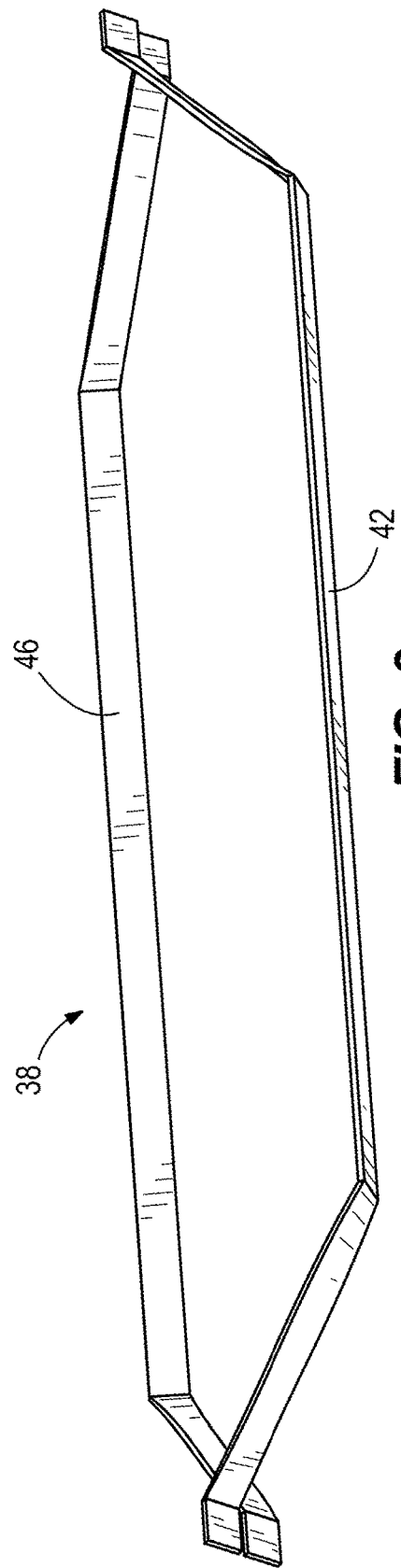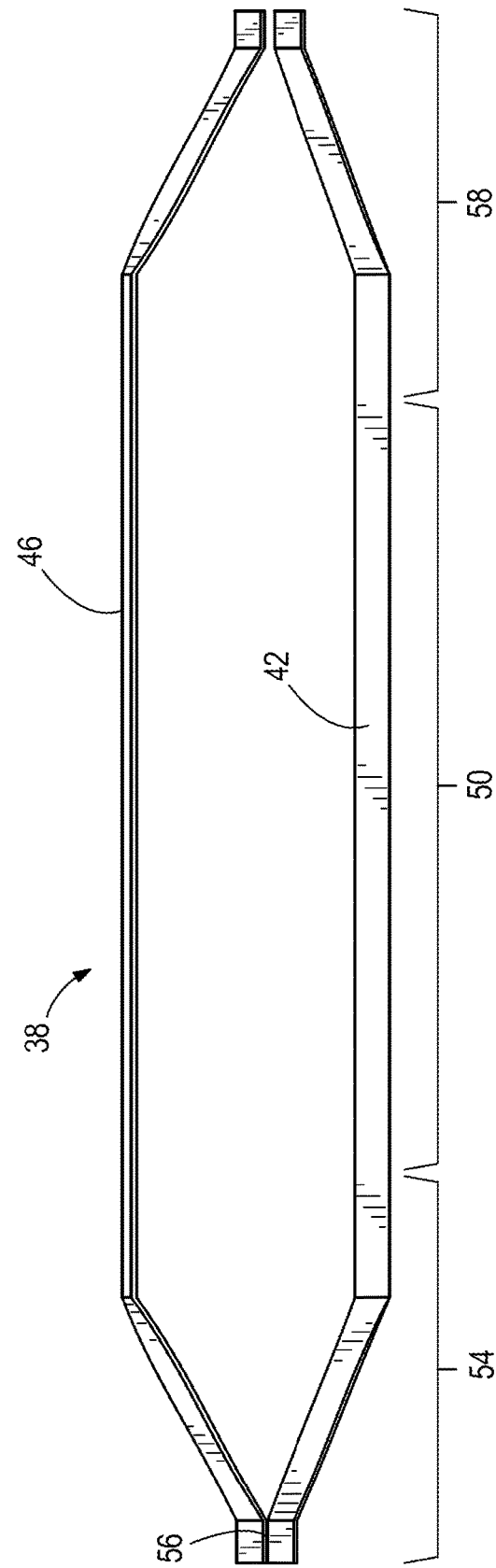

MECHANICAL STRENGTH OF CONNECTION OF WOUND ROTOR GENERATOR/MOTOR

CROSS-REFERENCE TO RELATED APPLICATIONS

This application claims priority to U.S. Provisional Patent Application No. 63/161,667, filed on Mar. 16, 2021, the entire contents of which are incorporated by reference herein.

BACKGROUND

The present application relates to wound rotor generators and wound rotor motors and, more particularly, to the connections of the wound rotor generator/motor. Some aspects of the invention relate particularly to wind turbine generator rotor construction and/or refurbishment.

SUMMARY

In one aspect, the invention provides a refurbished rotor of a wound rotor motor/generator having diamond-formed rotor windings removed from a rotor core thereof. The refurbished rotor includes a plurality of windings assembled to the rotor core, each of the plurality of windings manufactured from two separate bars, in particular, a top coil and a bottom coil, the top coil positioned in a rotor core slot at a position radially outward of a position of the bottom coil within another rotor core slot. Each top coil and each bottom coil has a flat rectangular cross-section. On a connection end of the rotor where rotor leads are attached, the top coil of each of the plurality of windings has a flat end positioned alongside and in alignment with a flat end of the bottom coil of an adjacent one of the plurality of windings. For each of the plurality of windings, the top coil and the bottom coil have respective flat ends joined to each other on a non-connection end of the rotor opposite the connection end by a joint for establishing electrical continuity.

In another aspect, the invention provides dual L-connectors that connect the cross connections ring to the coil ends to form cross connections of the winding, the dual L-connectors sandwiching the coil end therebetween.

In another aspect, the invention provides an L-conductor coupled to a line coil, an L-support coupled to a star coil, a plurality of support blocks supported on each of the L-conductor and the L-support, and an insulating rope coupling the L-conductor to the L-support.

BRIEF DESCRIPTION OF THE DRAWINGS

FIG. 3 is a perspective view of an embodiment of top and bottom coils.

FIG. 4 is a perspective view of the top and bottom coils shown in FIG. 3 with a connection end, non-connection end, and core section.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
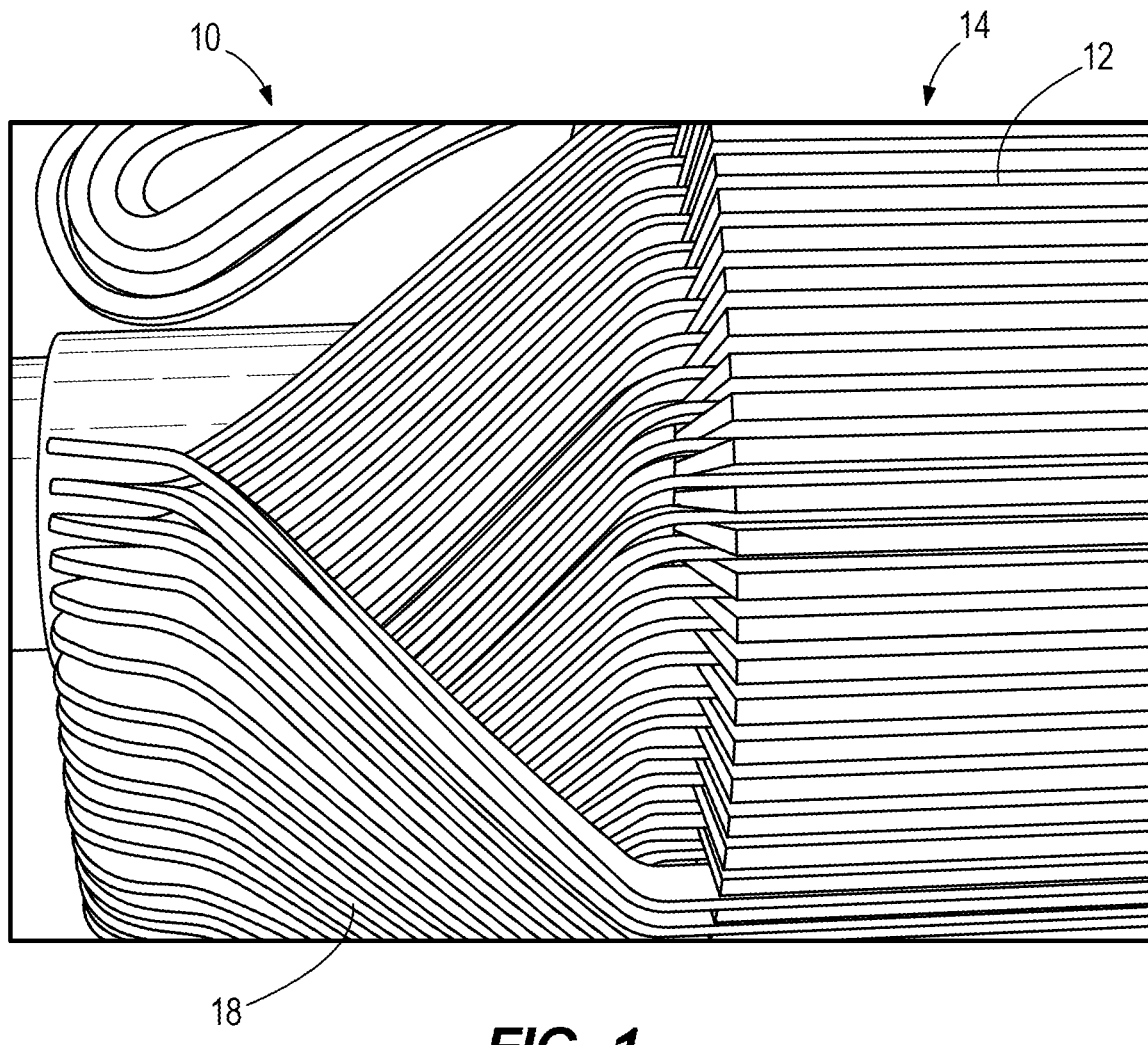
FIG. 1 is a perspective view of a non-connection end of a diamond coil rotor.
Figure 2:
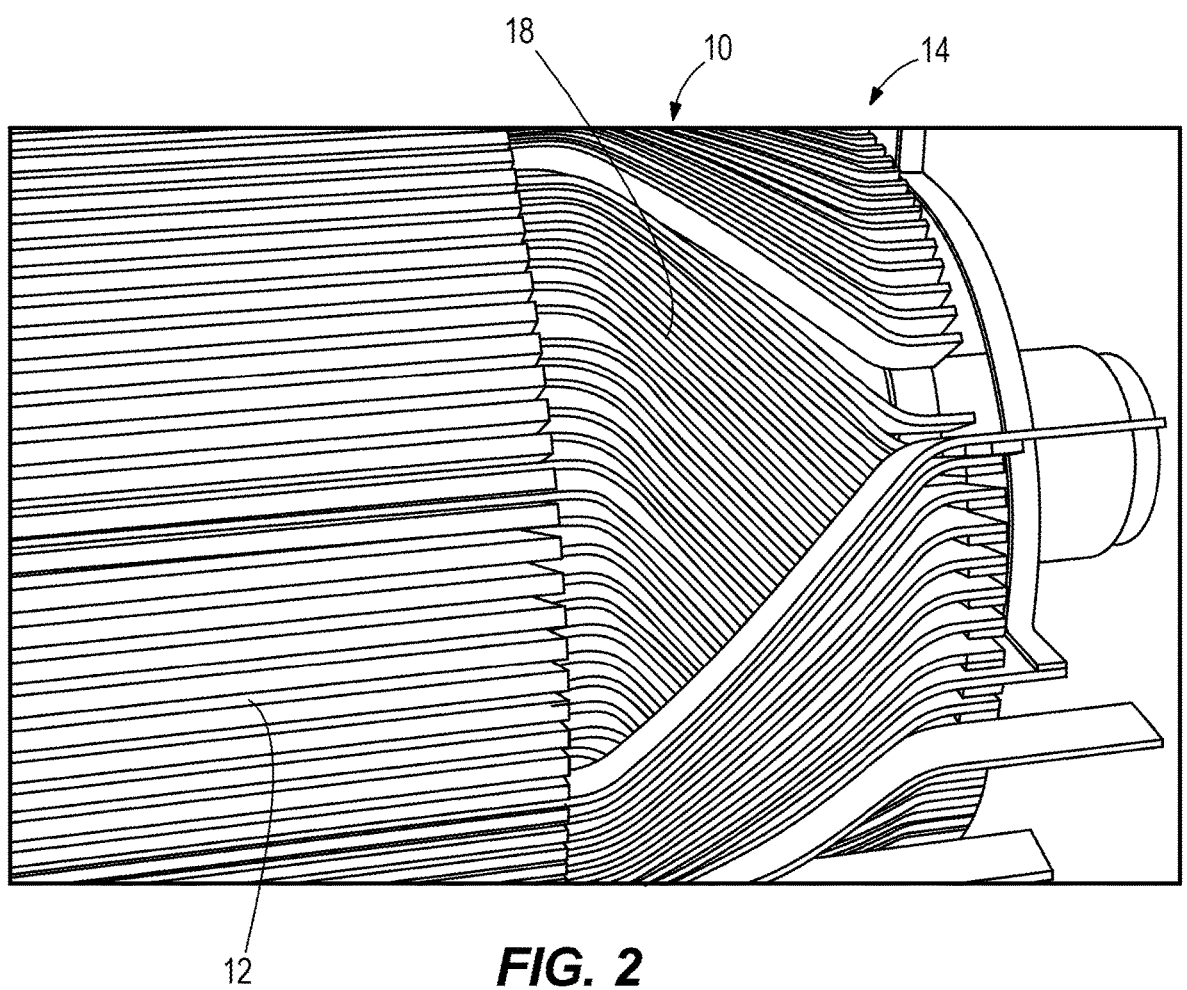
FIG. 2 is a perspective view a connection end of the diamond coil rotor.

FIGS. 1 and 2 illustrate a rotor 10 of a wound rotor generator/motor 14, also referred to as a slip ring induction generator/motor. A wound rotor generator/motor 14 is an induction machine having rotor windings 18 that are connected through slip rings to external resistance or power source. A speed/torque characteristic of the motor is controllable by modifying the external resistance. If an external power source is connected to the slip rings, the generator can be used to generate different/specific output frequencies—typically used in wind generators.

In comparison to a squirrel-cage rotor, which is another example of an induction motor, the rotor 10 of the wound rotor generator/motor 14 has more winding turns such that the induced voltage is higher, and the current is lower. The wound rotor motor 14 also has a higher starting torque. During the start-up, the rotor 10 has three poles connected to the slip ring with each pole wired in series with a variable power resistor. When the motor 14 reaches full speed the rotor poles are switched to short circuit. During start-up the resistors reduce the field strength at the stator, resulting in a reduced inrush current.

In a traditional wound rotor motor/generator such as the one shown in FIGS. 1 and 2, the rotor coils 18 and the structures that electrically and physically couple the rotor coils 18 to the rotor leads may be points of structural failure in the face of fatigue stress from normal use, leading to the need to repair or replace the rotor 10. Although the rotor 10 can be refurbished or replaced back to original specification, similar limited service life may be expected. On the other hand, the rotor 34 shown in FIGS. 3-20 includes improvements that may significantly increase the service life of a wound rotor motor/generator. Although not necessarily limited, the rotor 34 of FIGS. 3-20 can be a refurbishment or retrofit of components onto a pre-existing rotor like the rotor 10 of FIGS. 1-2, which may have failed in service. For example, the rotor coils 18 may be removed from the rotor core 12 of the failed rotor 10 and replaced entirely with components according to the design of the rotor the following description. Aspects of the illustrated rotor 34 may also be used in the construction of an original, previously unused apparatus.

FIGS. 3-20 illustrate the rotor 34 of a wound rotor generator/motor in various states of assembly with various components shown or removed for clarity. Even where shown and described separately, features of FIGS. 3-20 are understood to be useful as solitary improvements, useful in various combinations with each other, or useful all together in the construction of the rotor 34 of the wound rotor generator/motor.

Figure 5:
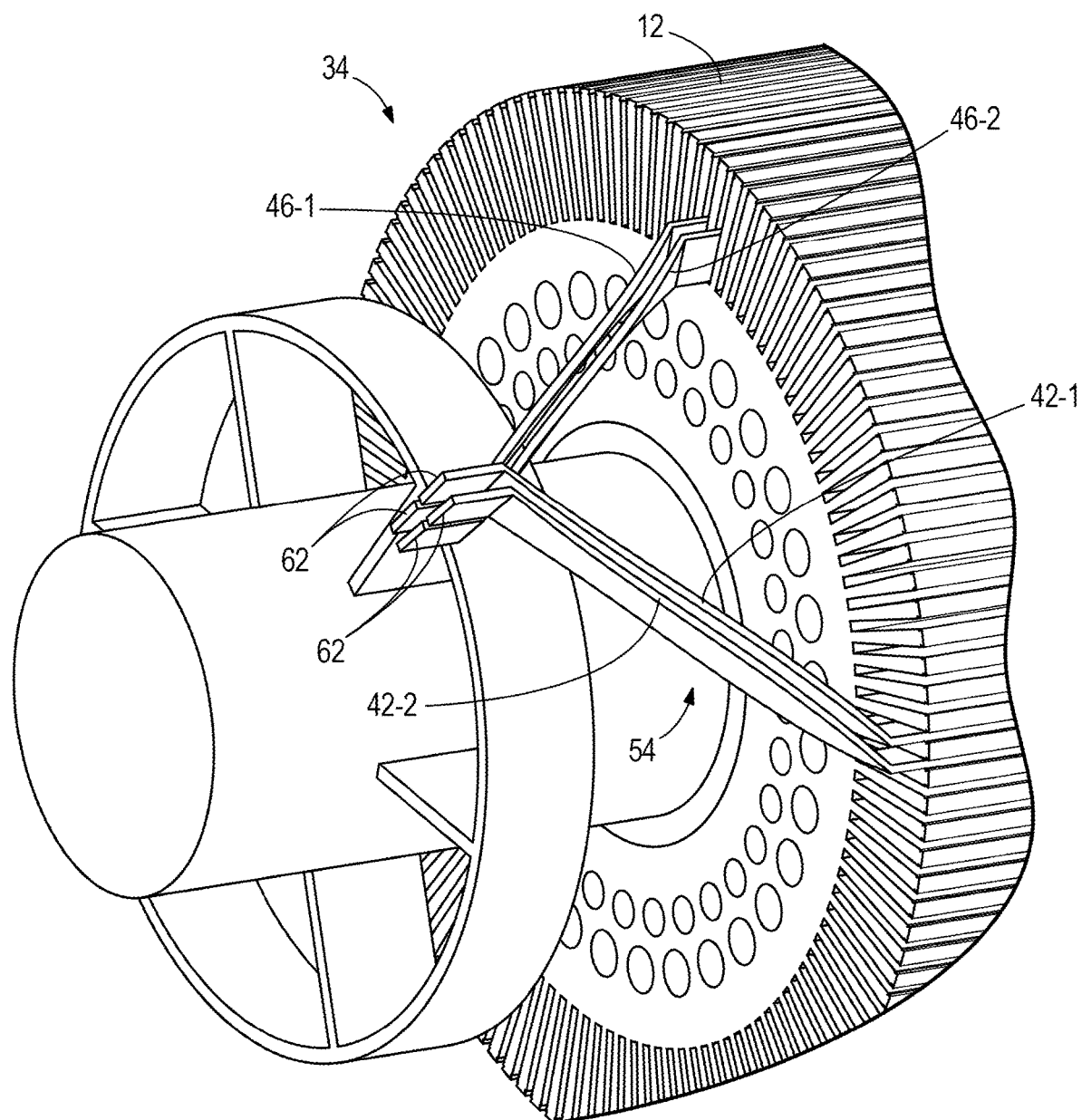
FIG. 5 is a perspective view of a non-connection end of a rotor having the top and bottom coils shown in FIG. 3.
Figure 6:
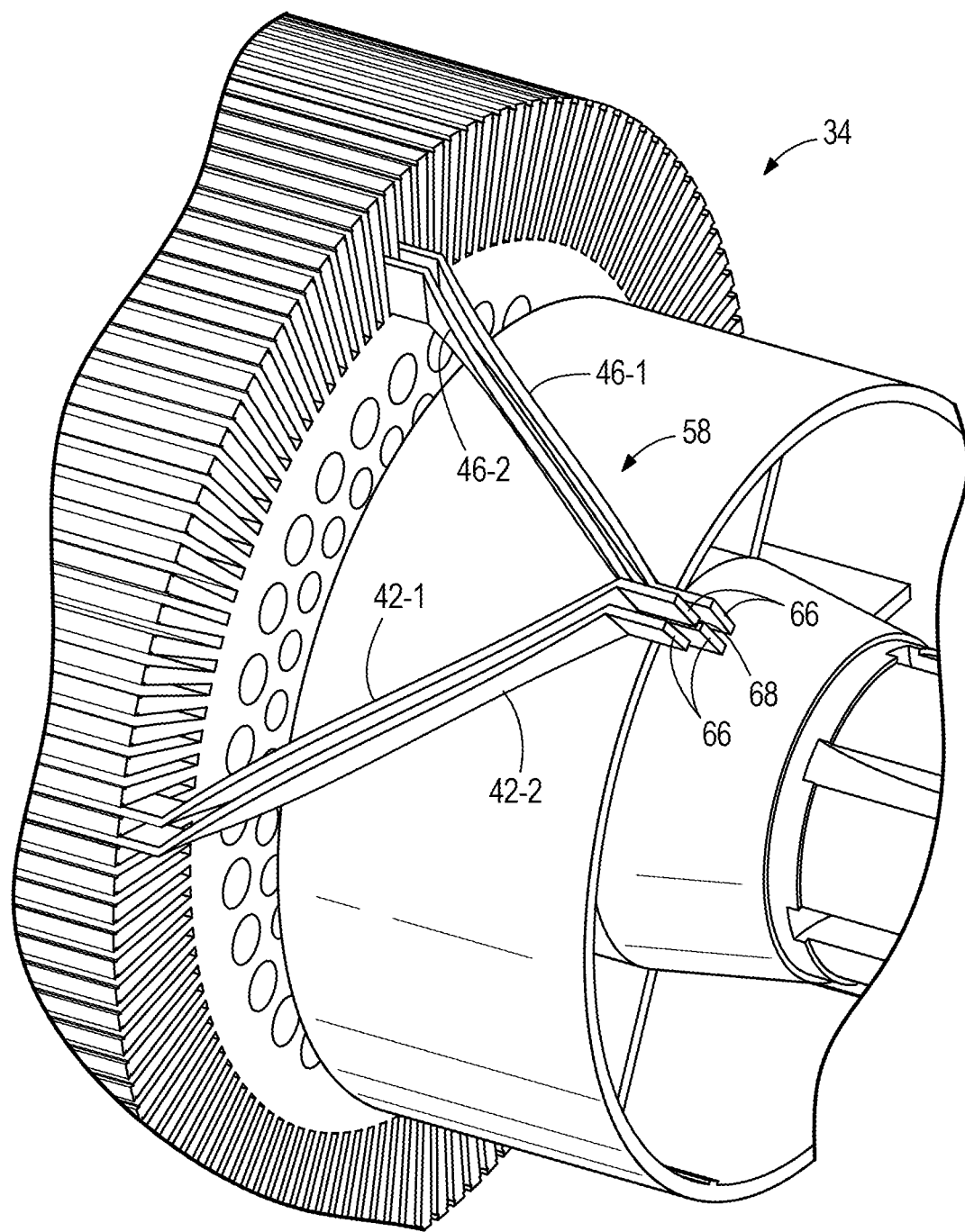
FIG. 6 is a partial perspective view of a connection end of a rotor having the top and bottom coils shown in FIG. 3.

The rotor windings 38 shown in FIG. 3 have a half bar design, deviating from the diamond coil design shown in FIGS. 1-2. This half bar design splits the winding into two separate bars—a top coil 42 and a bottom coil 46. The top coil 42 is positioned radially outward relative to the bottom coil 46 such that top coil 42 may otherwise be referred to as a radially outer coil and the bottom coil 46 may be referred to as a radially inner coil. Each of the top coil 42 and the bottom coil 46 have a substantially uniform rectangular cross-section along a length of the respective coil 42, 46. The profile of the cross-section can be described as a flat profile, as one of the rectangular dimensions may be at least 3, at least 4, or at least 5 times the other rectangular dimension. As shown in FIGS. 5-6 for example, the small dimension is arranged circumferentially to facilitate fitting the winding 38 into the corresponding rotor core slots. The larger rectangular dimension extends radially on the rotor. With respect to FIG. 4, each coil 42, 46 includes a central portion referred to as the core section 50, a non-connection end 54 extending from one end of the core section 50, and a connection end 58 extending from the other end of the core section 50. As shown in FIGS. 3-6, the core section 50 extends linearly, and the connection and non-connection ends 54, 58 extend at an angle from the core section 50. In some embodiments, the angle between the ends 54, 58 and the core portion 50 is a complex angle such that the opposing top and bottom coils 42, 46 align with one another when assembled at non-radially opposed positions.

FIG. 5 illustrates the non-connection ends 54 of installed top and bottom coils 42, 46 of two separate windings 38. The top and bottom coils of a first winding are labeled 42-1, 46-1. The top and bottom coils of a second winding are labeled 42-2, 46-2. For the sake of clarity in the drawing, the coils of only two windings 38 are shown. The distal end (opposite the core section) of each coil's non-connection end 54 includes a bent end portion 62 that has a flat profile and is angled relative to the remainder of the respective winding's non-connection end 54. As such, installation of the top and bottom coils 42-1, 46-1 of the first winding positions the flat end portions 62 alongside and in alignment with each other as shown in FIG. 5. Particularly, the respective flat end portions 62 are co-planar and aligned or stacked in the radial direction. In this arrangement, the top and bottom coils 42-1, 46-1 of the winding can be joined (e.g., soldered, brazed, or welded to form a joint 56, FIG. 4) to one another at the non-connection ends 54 to establish electrical continuity throughout the winding. For the second and each additional winding 38, a similar construction is provided whereby the winding's top and bottom coils (e.g., 42-2, 46-2 of second winding) are positioned and joined together in accordance with the preceding description.

At the opposite end of the rotor 34, the connection ends 58 of the top and bottom coils 42, 46 likewise include, at a distal end (opposite the core section), a bent end portion 66 that has a flat profile and is angled relative to the remainder of the respective winding's connection end 58. However, instead of the top and bottom coils 42-1, 46-1 of the first winding having their flat end portions 66 aligned, the top coil 42-1 of a first one of the windings 38 is positioned alongside and in alignment with the bottom coil 46-2 of an adjacent one of the windings 38 as shown in FIG. 6. The adjacent windings occupy successive or adjacent rotor core slots as shown. The positioning between the top and bottom coils 42-1, 46-2 of the adjacent windings can be co-planar and aligned or stacked in the radial direction. In this arrangement, the top and bottom coils 42-1, 46-2 can be joined (e.g., soldered, brazed, or welded to form a joint 68) to adjacent coils 42, 46 at the connection ends 58. This construction between each successive pair of windings 38, only two of which are shown in FIG. 6, is repeated in all of the rotor slots around the circumference of the rotor 34.

The half bar design can improve the manufacture and installation, thereby reducing labor time and lead times for delivery, despite that there are two windings 38 for each rotor slot rather than one winding per slot. Splitting the conductor for each rotor slot into multiple parallel sections reduces the mechanical force required to bend each coil 42, 46. Additionally, all top coils 42 are interchangeable such that a failure of a top coil 42 (e.g., during process testing), the top coil 42 can be swapped out with a new top coil 42 without removing or replacing any of the bottom coils 46 or any of the other top coils 42. The bottom coils 46 are likewise interchangeable having similar advantages as the top coils 42 as described herein.

Figure 7:
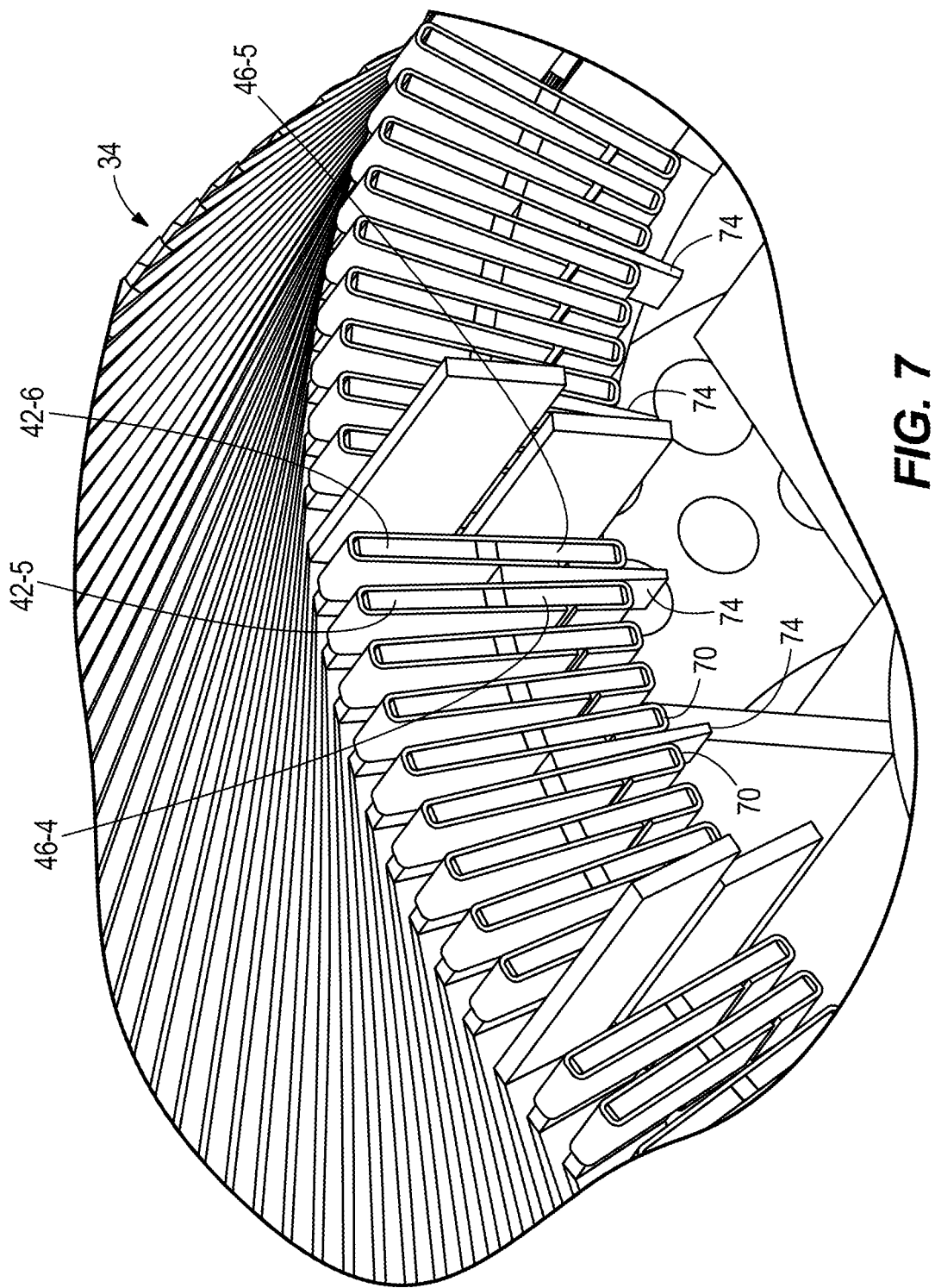
FIG. 7 is a perspective view of the connection end having extended spacer blocks between connections.
Figure 8:
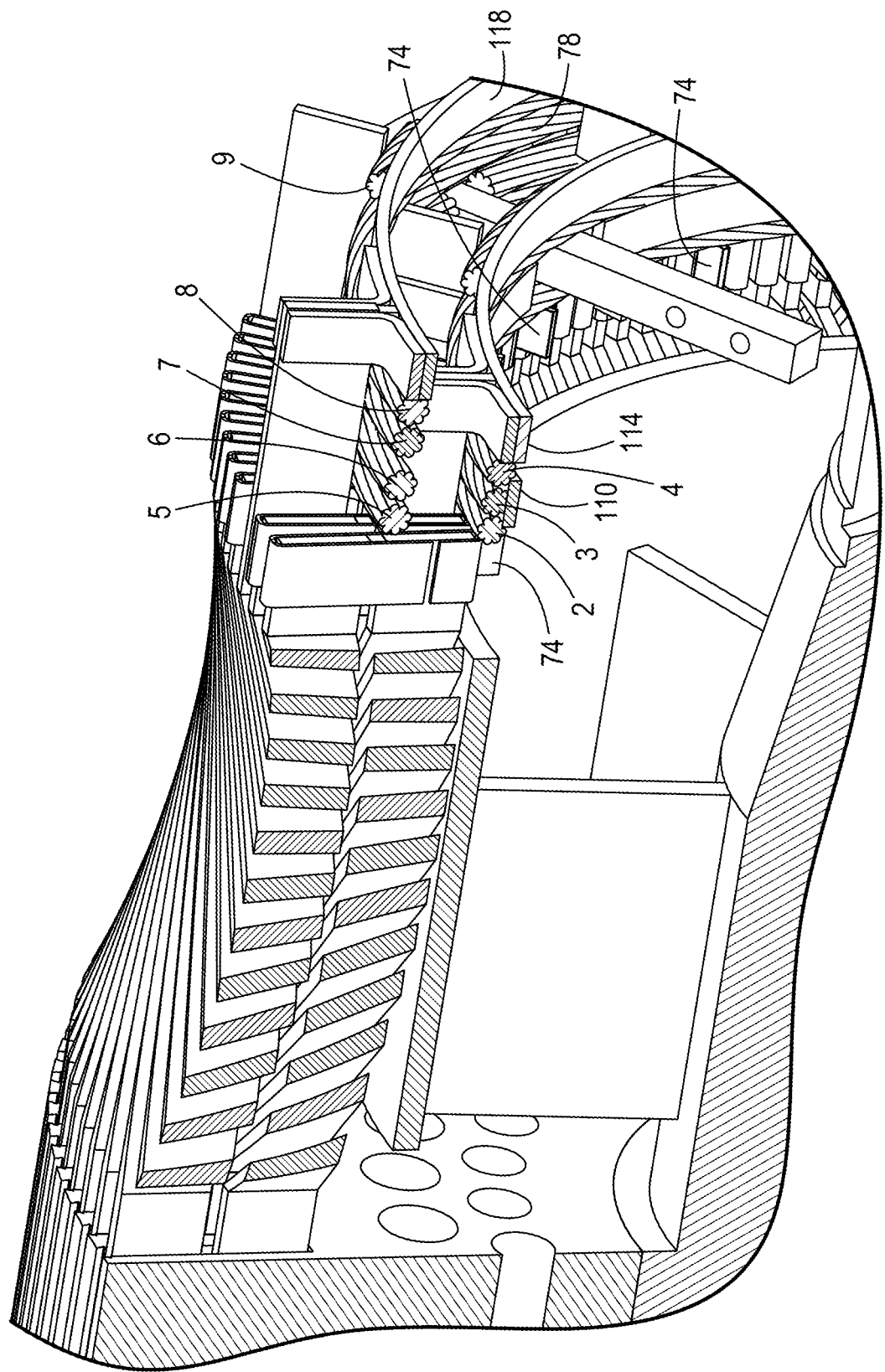
FIG. 8 is a perspective view of the connection end having insulating rope.

As shown in FIG. 7, extended spacer blocks 74 are positioned between bottom coils 46 at the connection end 58. The extended spacer blocks 74 extend radially inwardly such that they protrude past the end of the coils 46 to a position located radially inward of the bottom coils 74. The extended spacer blocks 74 are manufactured from a glass mat or laminate saturated and cured with polyester resin or epoxy resin. The distance between each block is less than or equal to 2 inches. For example, if the inner diameter of the blocks is 30 inches, the circumference is therefore approximately 94.2 inches, such that 48 total blocks (94.2/2 rounded up) is the minimum required number of blocks to maintain the 2-maximum distance between blocks. As shown, the blocks 74 are tapered to fit snug between adjacent connection clips 70. The spacer blocks 74 are utilized to mechanically retain insulating glass rope 78 as shown in FIG. 8 and discussed in greater detail below. Dimensions given above can be representative of a 3 MW generator, for example, that of the V-90 design of Vestas Wind Systems of Denmark.

FIG. 8 illustrates several rows of insulating rope 78 installed relative to the spacer blocks 74. The insulating rope 78 spaces conductor components relative to one another. Additionally, the rope 78 mechanically retains, secures, and insulates the conductor components. In some embodiments, the insulating rope 78 is a bundle of glass fiber rovings encased in a braided fiberglass sleeving. In alternative embodiments, the insulating rope 78 may be, for example, tadpole tape, a dense fiberglass rope, or a low-density fiberglass rope. Some embodiments may use different ropes based on the available space for the rope. The insulating rope 78 may have a circular cross-section having a diameter of, for example, ¼", ½", ¾", or 1". Alternatively, the insulating rope may have a rectangular cross-section having, for example, a width of 1" and a height of ¼". The insulating rope 78 may be heat resistant to high temperatures (e.g., greater than 900 degrees Fahrenheit) in view of the relatively high temperatures reached within the motor based on, for example, run time, speed of the motor, and ambient temperature.

Prior to impregnating the insulating rope 78 with resin (polyester, epoxy, silicone), the insulating rope 78 is compressible (e.g., compressible by 33%, compressible by 50%) such that the insulating rope is oversized for the available space (e.g., sized to 150% of the available space), thereby permitting good compression and a snug fit of the insulating rope 78 within the available space.

As shown in FIG. 8, the insulating rope 78 is installed at various locations. At reference numeral 2, the insulating rope 78 is positioned axially between the extended spacer blocks 74 and a first cross connection assembly 110 at a location below (i.e., radially inward from) the bottom coil 46. At reference numeral 3, the insulating rope 78 is positioned axially between the first cross connection assembly 110 and a second cross connection assembly 114 at a location below the bottom coil 46. At reference numeral 4, the insulating rope 78 is located on top of the second cross connection assembly 110 at a location below the bottom coil 46. At reference numerals 5 and 6, the insulating ropes 78 are positioned on top of the bottom coil 46 and below the top coil 42 at a location below the first cross connection assembly 110. At reference numeral 7, the insulating rope 78 is located on top of the bottom coil 46 and below the top coil 42. At reference numeral 8, the insulating rope 78 is positioned on top of the bottom coil 46 and below the top coil 42 at a location next to a star connection assembly 118. At reference numeral 9, the insulating rope 78 is positioned on top of the star connection assembly 118 and below the top coil 42. The quantity of insulating ropes 78 may be increased depending on the specific configuration and widths of the first and second cross connection assemblies 110, 114 and the star connection assembly 118. The cross connection assemblies 110, 114 and star connection assembly 118 are discussed in greater detail below.

Figure 9:
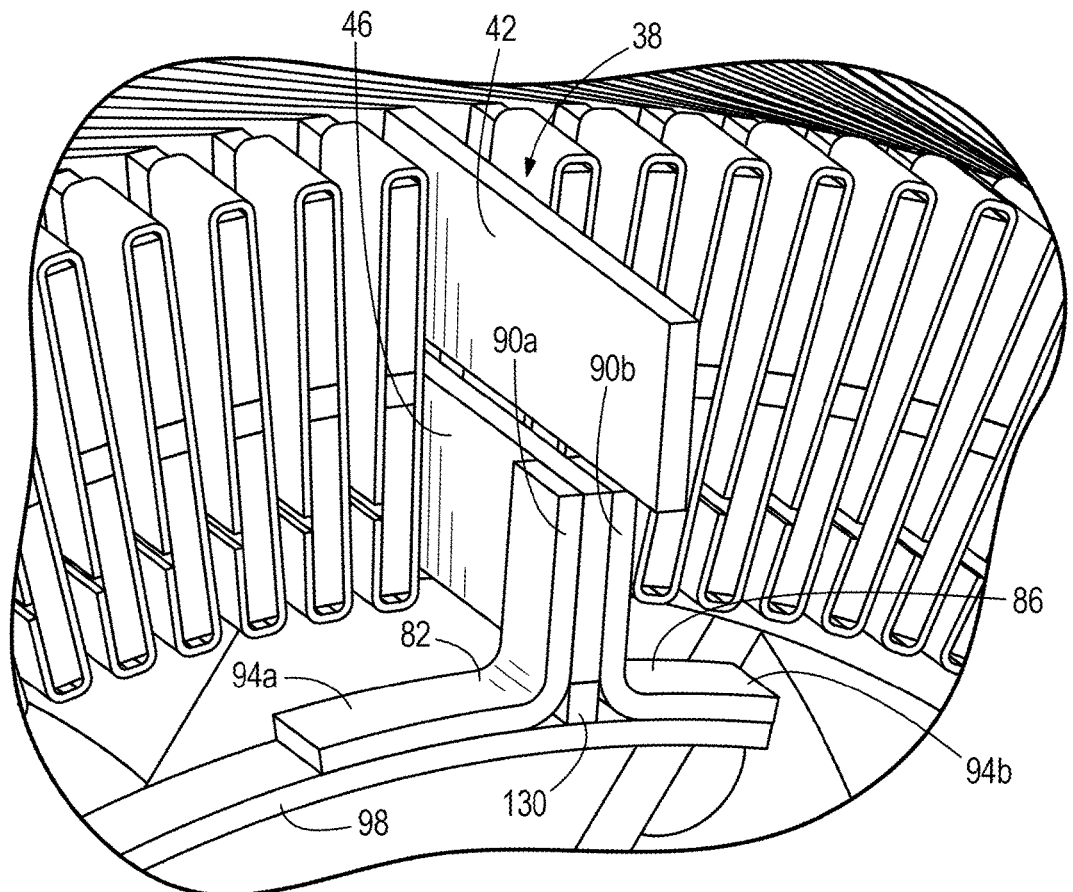
FIG. 9 is a perspective view of the connection end having a cross connection assembly formed of dual L-connectors located on a cross connection ring.

FIG. 9 illustrates two L-shaped connectors 82, 86 that connect the cross connection ring 98 to the coil ends to form the cross connections of the windings 38. As shown, each L-connector 82, 86 has a height along a first portion 90*a*, 90*b*, a radial portion, that extends across the entire height of the bottom coil 46. A second portion 94*a*, 94*b* of each L-connector 82, 86, a circumferential portion, extends transverse to the first portion 92*a*, 92*b* and rests upon the cross connection ring 98. As the cross connection ring 98 is arcuate, the second portion 94*a*, 94*b* of each L-connector 82, 86 may be likewise arcuate, shaped to fit adjacent to the outer diameter of the cross connection ring 98. The L-connector 82, 86 is formed as a unitary, bent component such that the transition between the first portion 92*a*, 92*b* and the second portion 94*a*, 94*b* includes a radius.

The dual L-connectors 82, 86 are mounted back-to-back, sandwiching the bottom coil 46 therebetween, in the circumferential direction, such that the first portions 92*a*, 92*b* of the dual L-connectors 82, 86 are parallel to one another and abut opposing sides of the bottom coil 46. Additionally, the second portions 94*a*, 94*b* extend away from the bottom coil 46 and from one another along the circumference of the cross connection ring 98. As shown, the lengths of the second portions 94*a*, 94*b* of the L-connectors 82, 86 may differ in order to provide space for fitment of other parts.

A filler spacer 130 is positioned between the bottom coil 46 and the cross connection ring 98 to fill the gap formed between the cross connection ring 98, the bottom coil 46, and the dual L-connectors 82, 86. The placement of the filler spacer 130 maintains a gap between the cross connection ring 98 and the bottom coil 46 for the insulating rope 78 shown in FIG. 8 at reference numerals 2, 3, and 4.

Figure 10:
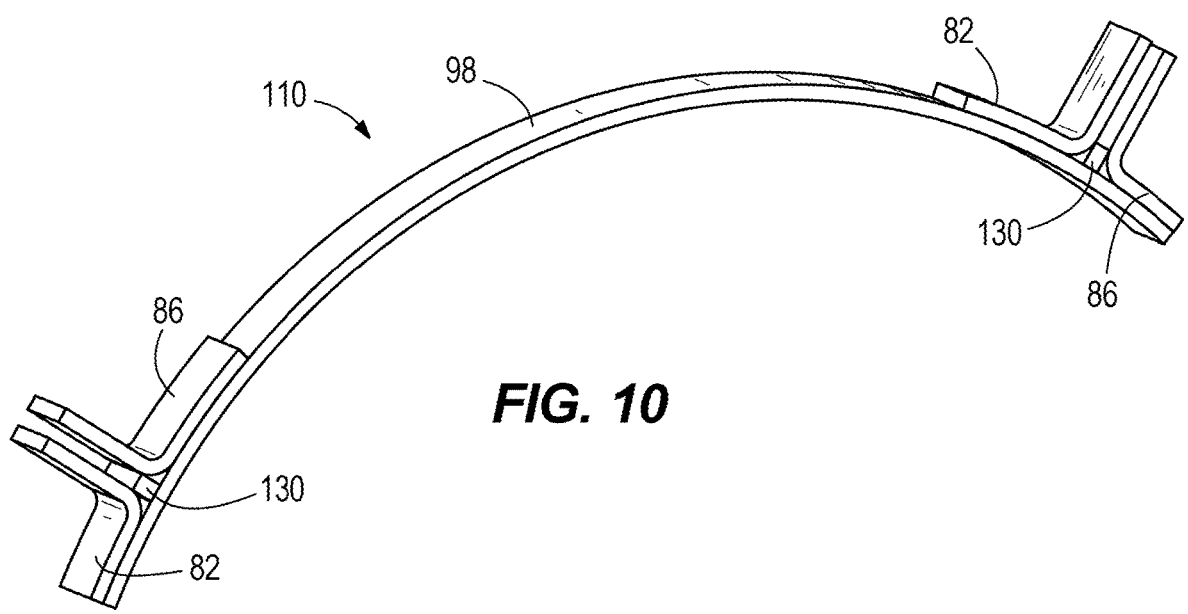
FIG. 10 is a perspective view of the cross connection assembly.
Figure 11:
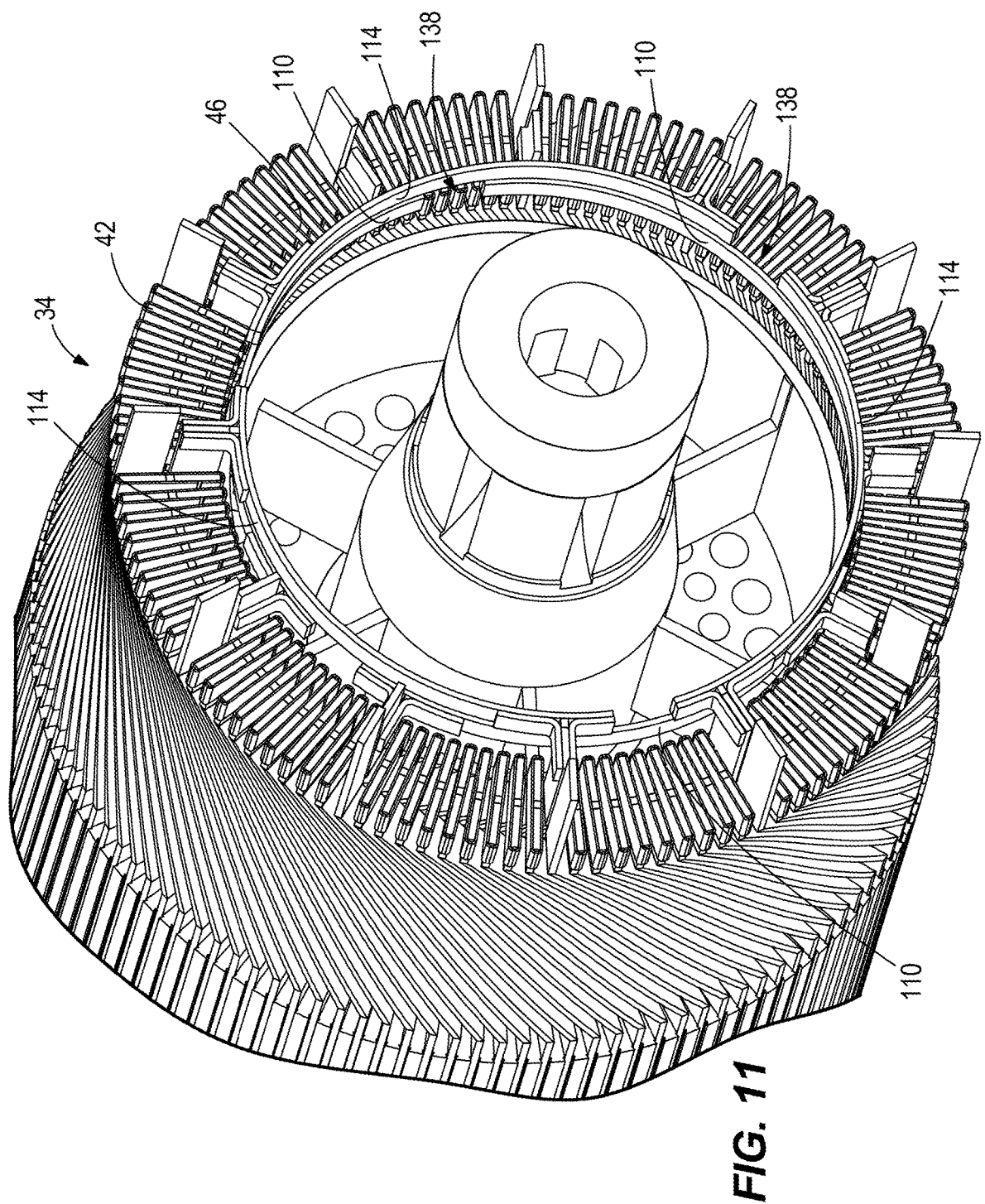
FIG. 11 is a perspective view of the connection end having a plurality of cross connection assemblies.

Multiple sets of the dual L-connectors 82, 86 are secured (e.g., brazed, soldered, welded) to both ends of the cross connection rings 98 to form cross connection assemblies 110, as shown in FIG. 10. As shown in FIG. 11, several cross connection assemblies 110 are used in combination with one another on a single rotor assembly. As shown, three of the cross connection assemblies 110 are considered back cross connection assemblies and the other three cross connection assemblies 114 are considered front cross connection assemblies. The back cross connection assemblies 110 are those that are nearest to the core and the front cross connection assemblies 114 are those that are furthest from the core. The front and rear cross connection assemblies 110, 114 each form nearly full circles, with gaps 138 (e.g., 5-10 degree gaps) between each assembly 110, 114. Accordingly, the cross connection rings 98 may be considered arcuate ring segments, rather than full rings. The front and rear cross connection assemblies 110, 114 are coaxial with one another and have substantially similar diameters such that they are effectively stacked axially on each other. The gaps 138 between adjacent front cross connection assemblies 114 are offset are rotationally offset (e.g., by 45 degrees) from the gaps 138 between adjacent back cross connection assemblies 114.

Figure 12:
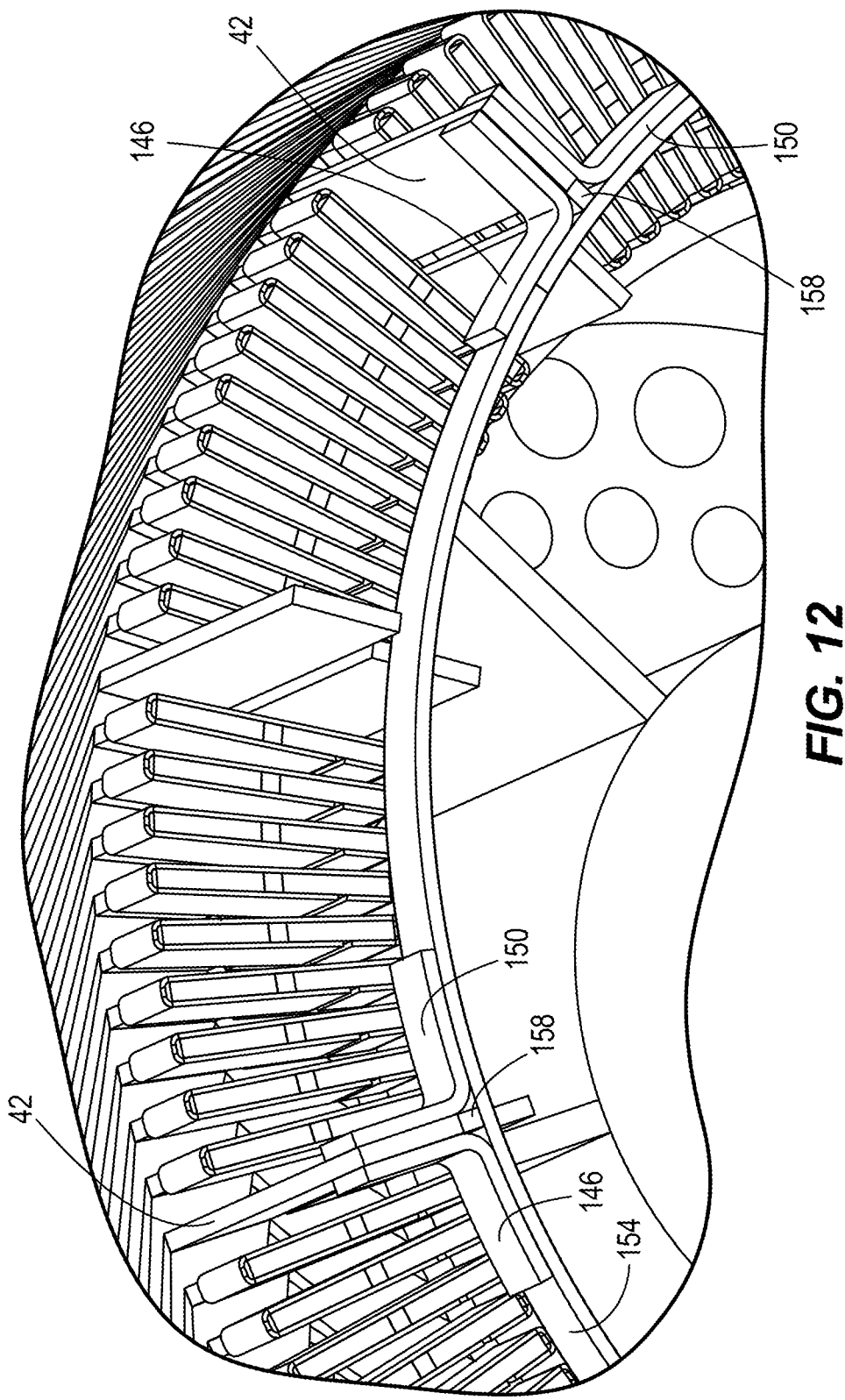
FIG. 12 is a perspective view of the connection end having a star connection assembly formed of dual L-connectors mounted onto a star connection ring.
Figure 13:
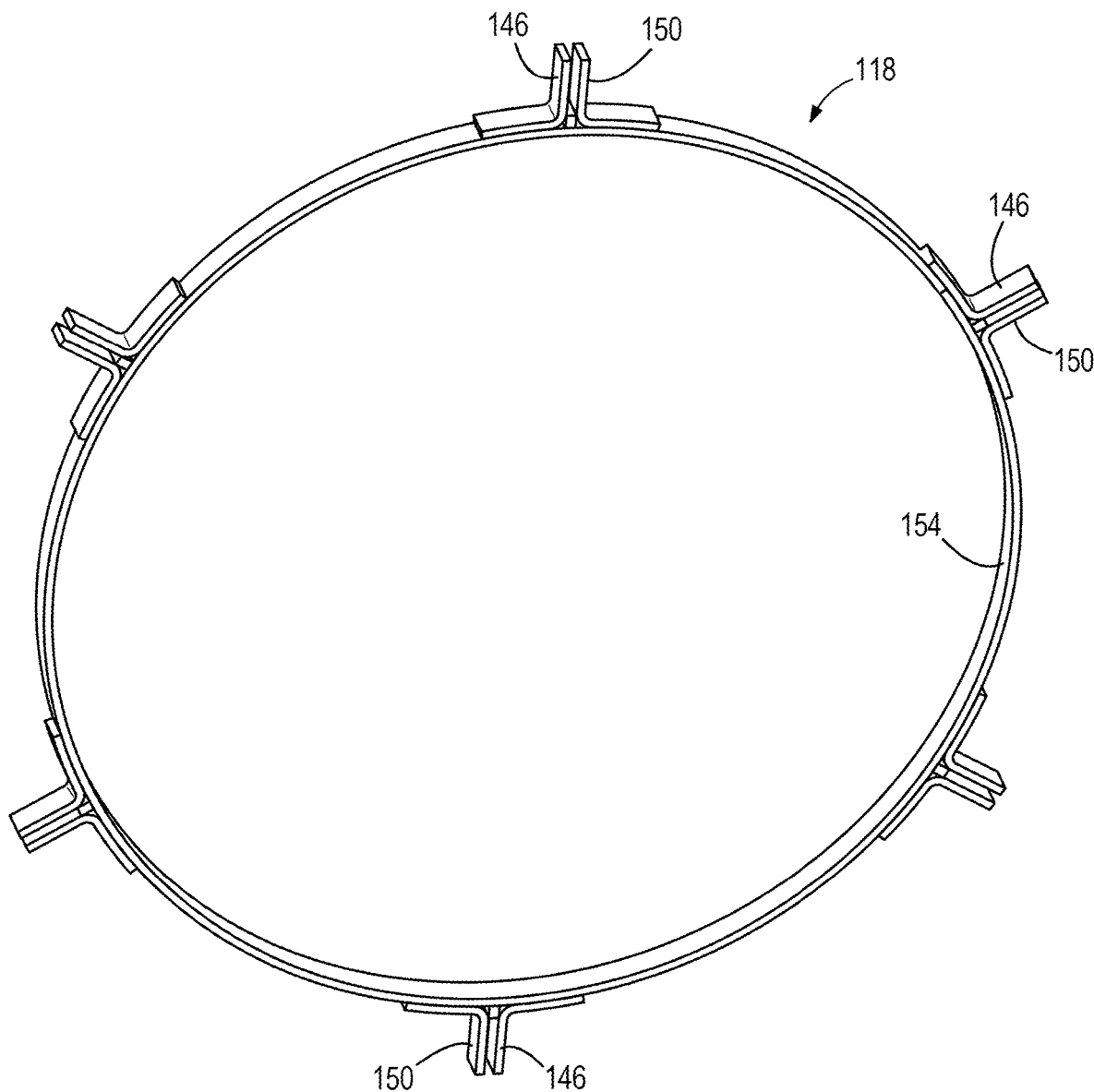
FIG. 13 is a perspective view of the star connection assembly.

FIGS. 12-13 illustrate multiple dual L-connectors 146, 150 mounted to a star connection ring 154 to form the star connection assembly 118. The dual L-connectors 146, 150 are substantially similar to the dual L-connectors 82, 86 shown in FIGS. 10-11 with respect to the cross connection ring 98. The dual L-connectors 82, 86 are mounted to the star connection ring 154 in a similar back-to-back manner, sandwiching the top coil 42 therebetween. A filler spacer 158 is positioned between the bottom of the top coil 42 and the outside diameter of the star connection ring 154 between the dual L-connectors 146, 150. As shown in FIG. 13, multiple sets of the dual L-connectors 146, 150 are secured (e.g., brazed, soldered, welded) onto the outside diameter of the star connection ring 154 to form the star connection assembly 118.

Figure 14:
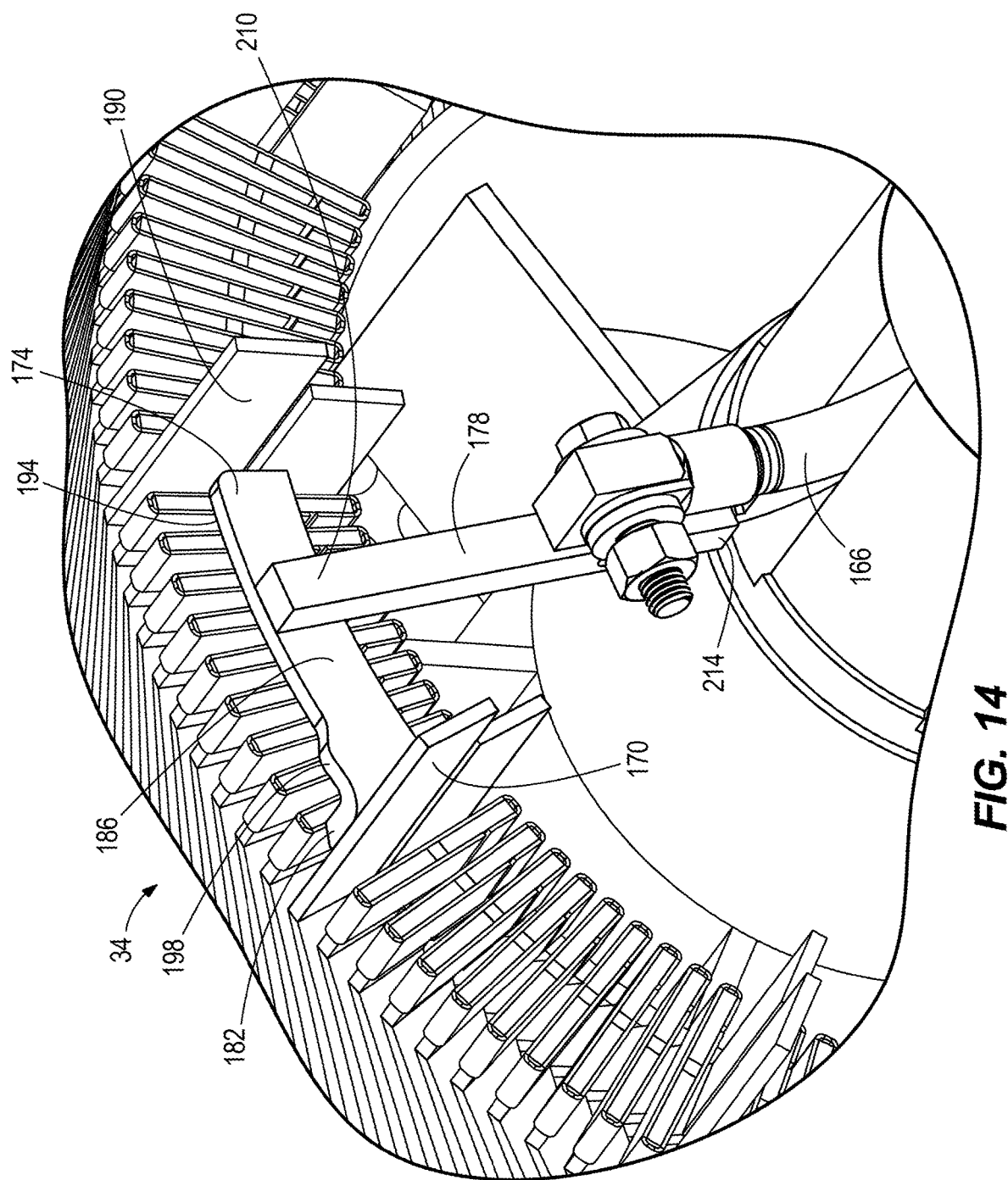
FIG. 14 is a perspective view of a connection between the line rotor coil ends and rotor leads at the connection end, the connection having an L-conductor and a line connection bar.
Figure 15:
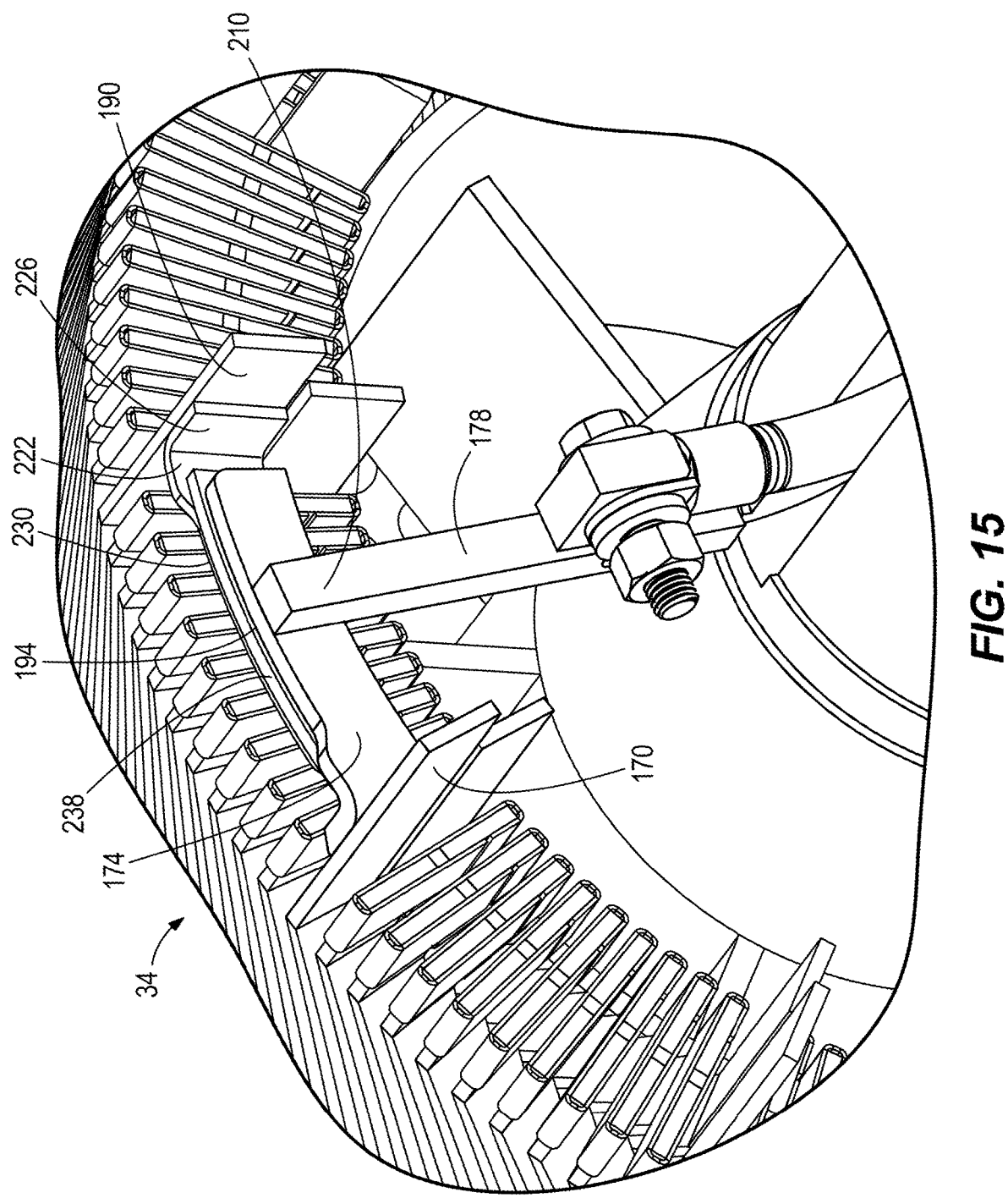
FIG. 15 is a perspective view of the connection shown in FIG. 14 with an L-support.
Figure 16:
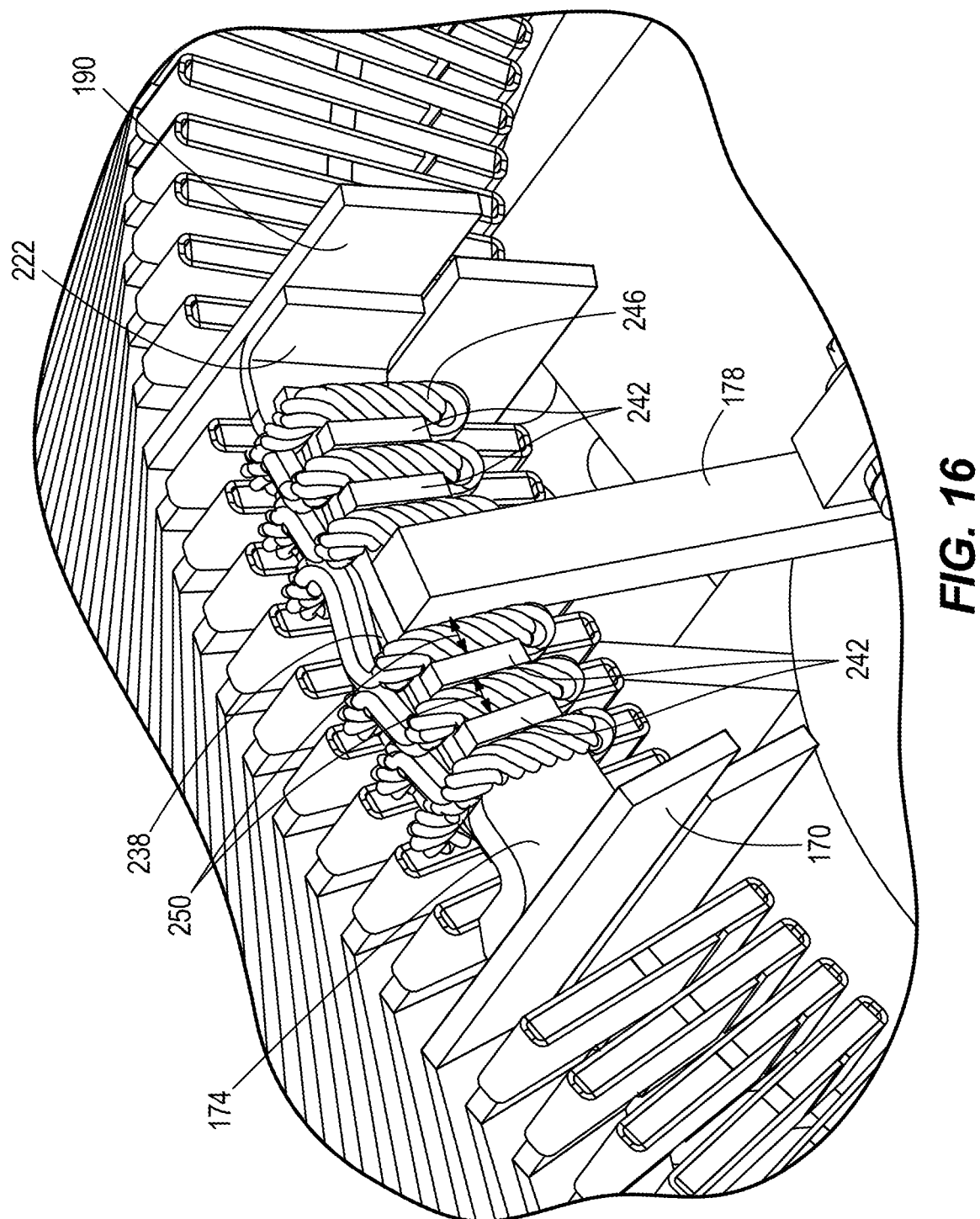
FIG. 16 is a perspective view of the connection shown in FIG. 15 with insulating rope around the L-conductor and L-support.

FIGS. 14-20 illustrate a line rotor coil connection to the rotor lead 166 at the connection end 58. FIG. 14 illustrates the line rotor coil 170, and an L-conductor 174 and rectangular line connector bar 178 that connect the end of the line rotor coil 170 to the rotor leads 166. A first portion 182, an axial portion, of the L-conductor 174 is in contact with the end of the line coil 170. A second portion 186 of the L-conductor 174, a circumferential portion, extends transverse (e.g., in a perpendicular plane) with respect to the first portion 182 such that the first and second portions 182, 186 define an L-shape. The second portion 186 extends away from the line coil 170 and towards an adjacent end of a star rotor coil 190. An outer edge 194 (nearer the outer diameter of the rotor 34) of the second portion 186 of the L-conductor 174 is a curved edge following a smaller radius away from the first portion 182 to create a shoulder 198 and to allow for fitment of insulating rope 246, as shown in FIG. 16 and described in greater detail below. While the shoulder 198 and curved surface are shown on the radially outer edge, they may otherwise or additionally be located on the radially inner edge of the L-conductor 174.

With continued reference to FIG. 14, the line connector bar 178 has a rectangular cross-section and is secured (e.g., brazed, soldered, welded) at a radially outer end 210 to the L-conductor 174. A radially inner end 214 is secured to the rotor lead 166, as described in greater detail below with respect to FIG. 20. As the L-conductor 174 and the line conductor bar 178 both carry current, they are formed in some embodiments from copper. In other embodiments, one or both of the L-conductor 174 and the line connector bar 178 may be otherwise manufactured from other copper alloys such as brass, bronze, chrome copper zirconium (CuCrZr), or beryllium copper (CuBe).

FIG. 15 illustrates that the end of the star rotor coil 190 has an L-support 222 that is aligned axially with the second portion 186 of the line coil L-conductor 174. The L-support 222 is manufactured from a high mechanical strength copper alloy such as brass, bronze, chrome copper zirconium (CuCrZr), or beryllium copper (CuBe) and is sized and shaped similar to the L-conductor 174. More specifically, the L-support 222 includes a first portion 226, an axial portion, that is secured (e.g., brazed, soldered, welded) to the end of the star coil 190 such that the length of the first portion 226 (between a distal end and a second portion 230 of the L-support 222) abuts the end of the star coil 190. The second portion 230 of the L-support 222, a circumferential portion, extends transverse (e.g., in a perpendicular plane) with respect to the first portion 226 such that the first and second portions 226, 230 define an L-shape. The second portion 230 extends away from the star rotor coil 190 and towards an adjacent end of a line rotor coil 170 to which the L-conductor 174 is affixed. The distal end of the first portion 226 of the L-support 222 is located nearer to the end of the star rotor coil 190 such that the second portion 230 of the L-support 222 is located axially inward of the first portion 226 of the L-support 222. In contrast, the L-conductor 174 is arranged in an opposite manner, with the distal end of the first portion 182 of the L-conductor 174 being located axially inward of the second portion 186 of the L-conductor 174. In this way, the L-conductor 174 and L-support 222 are nested relative to one another with the second portions 186, 230 of the respective L-support 174 and L-conductor 222 being aligned axially (common or overlapping axial position) with the first portion 226, 182 of the other.

The second portion 230 of the L-support 222 is parallel to and spaced apart axially from the second portion 186 of the L-conductor 174. An insulator 238 is positioned axially between the second portions 186, 230 of the L-conductor 174 and the L-support 222 to physically space and electrically insulate the second portions 186, 230 from one another. The insulator 238 may be constructed of a felt material. In other embodiments, the insulator 238 may be made from a rigid material such as a GP03 glass mat with polyester resin or a G10 glass laminate with epoxy resin. As shown, the insulator 238 is sized and shaped to follow the overlapping shape of the two second portions 186, 230.

FIG. 16 illustrates rectangular support blocks 242 connected to the L-conductor 174 and the L-support 222 to facilitate the winding of the insulating rope 246 around the L-conductor 174 and the L-support 222. As shown, the rectangular blocks 242 are secured (e.g., brazed, soldered, welded) to the axially outer surface of the L-conductor 174. Although not shown, similar rectangular blocks are also secured to the axially inner surface of the L-support 222 (i.e., the blocks are provided on opposing surfaces of the L-conductor 174 and the L-support 222 that face away from one another). The support blocks 242 can be manufactured from copper though may be otherwise manufactured from a copper alloy such as brass, bronze, chrome copper zirconium (CuCrZr), or beryllium copper (CuBe). The blocks 242 are spaced equidistant from one another or otherwise spaced to create gaps 250 therebetween of equal size (recognizing that the line connector bar 178 interrupts the equidistant spacing on the L-conductor 174). As shown, two support blocks 242 are located on either side of the line connector bar 178 on the L-conductor 174 and similarly arranged support blocks (not shown) are located on the L-support 222.

The insulating rope 246 is wrapped around the L-conductor 174 and the L-support 222, guided by the support blocks 242. The insulating rope 246 may be the same as the insulating rope 78 described above with respect to FIG. 8. The insulating rope 174 is wrapped along the gaps 250 between the adjacent support blocks 242 on the L-conductor 174, over the curved profile located adjacent the shoulder 198 and around the insulator 238, and along the gaps between the adjacent support blocks on the L-support 222. The insulating rope 246 encircles the L-conductor 174 and L-support 222 multiple times, thereby coupling the L-conductor 174 to the L-support 222. As shown, the insulating rope 246 wraps around six times, once along each gap 250 adjacent to a support block 242. With the insulating rope 246 installed, the line coil ends 170 and L-conductor 174 are mechanically supported by the L-support 222 that is secured to the star coil ends 190.

Figure 17:
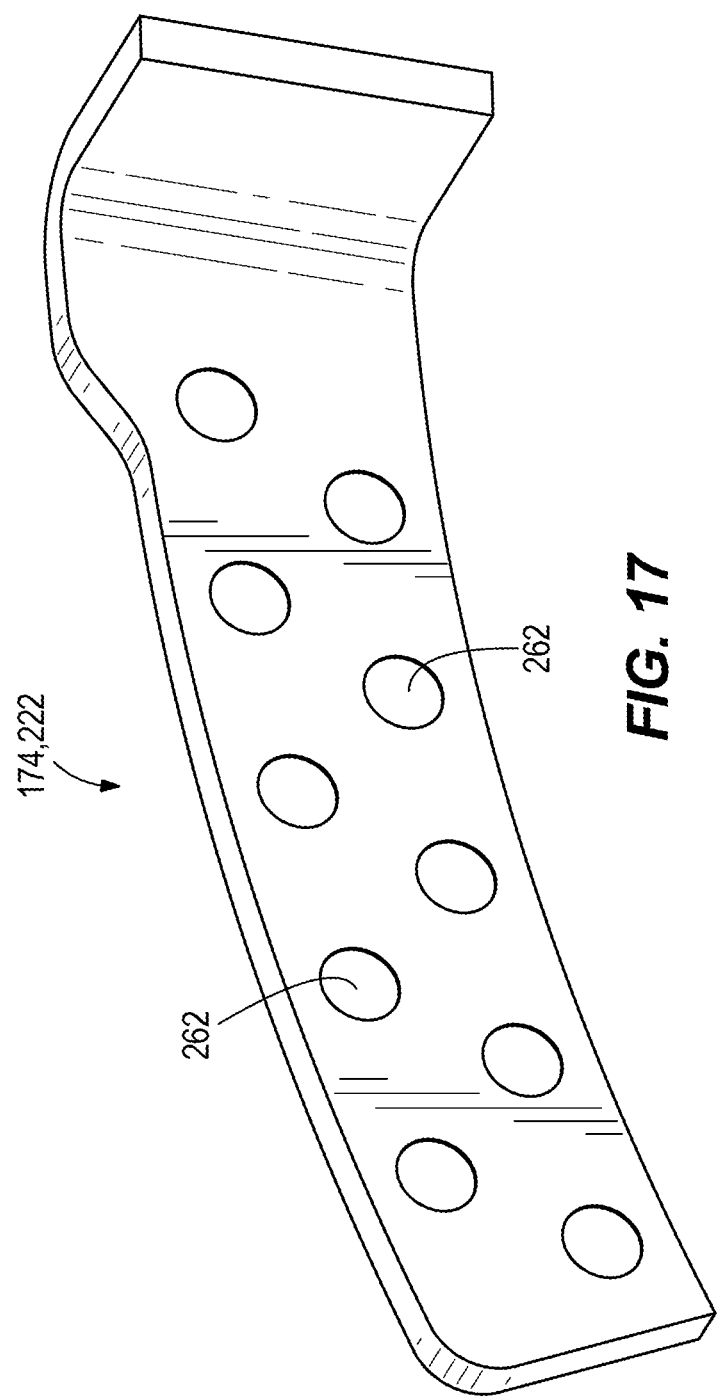
FIG. 17 is a perspective view of the L-conductor or L-support having flat bottom holes.

FIG. 17 illustrates an inner face of the L-conductor 174 or the L-support 222 (inner referring to inside of the "L" shape), as both elements can share the same design. The inner face of the L-conductor 174 is in a facing relationship with the inner face of the L-support 222 such that the inner faces are adjacent to one another, separated only by the insulator 238 therebetween. As shown, the inner face includes depressions or blind holes 262 such as shallow flat bottom holes that are sized (e.g., diameter, depth, quantity) to ensure that the remaining cross-sectional area for the L-conductor 174 is sufficient to carry the required rotor line current. Flat bottom holes (as opposed to, for example, tapered holes), avoid a stress concentration at the center point of the hole which may otherwise result in a stress fracture. When the felt insulator 238 is impregnated with resin (e.g., polyester, epoxy, silicone), it expands into the flat bottom holes 262. When the resin is cured, the resin and felt, in combination with the shallow, flat bottom holes 262, provide increased mechanical strength to the interface between the L-conductor 174 and the L-support 222 while still maintaining a high voltage insulation level. The flat bottom holes 262 may be machined or drilled using an endmill bit or a 180-degree counterbore drill.

Figure 18:
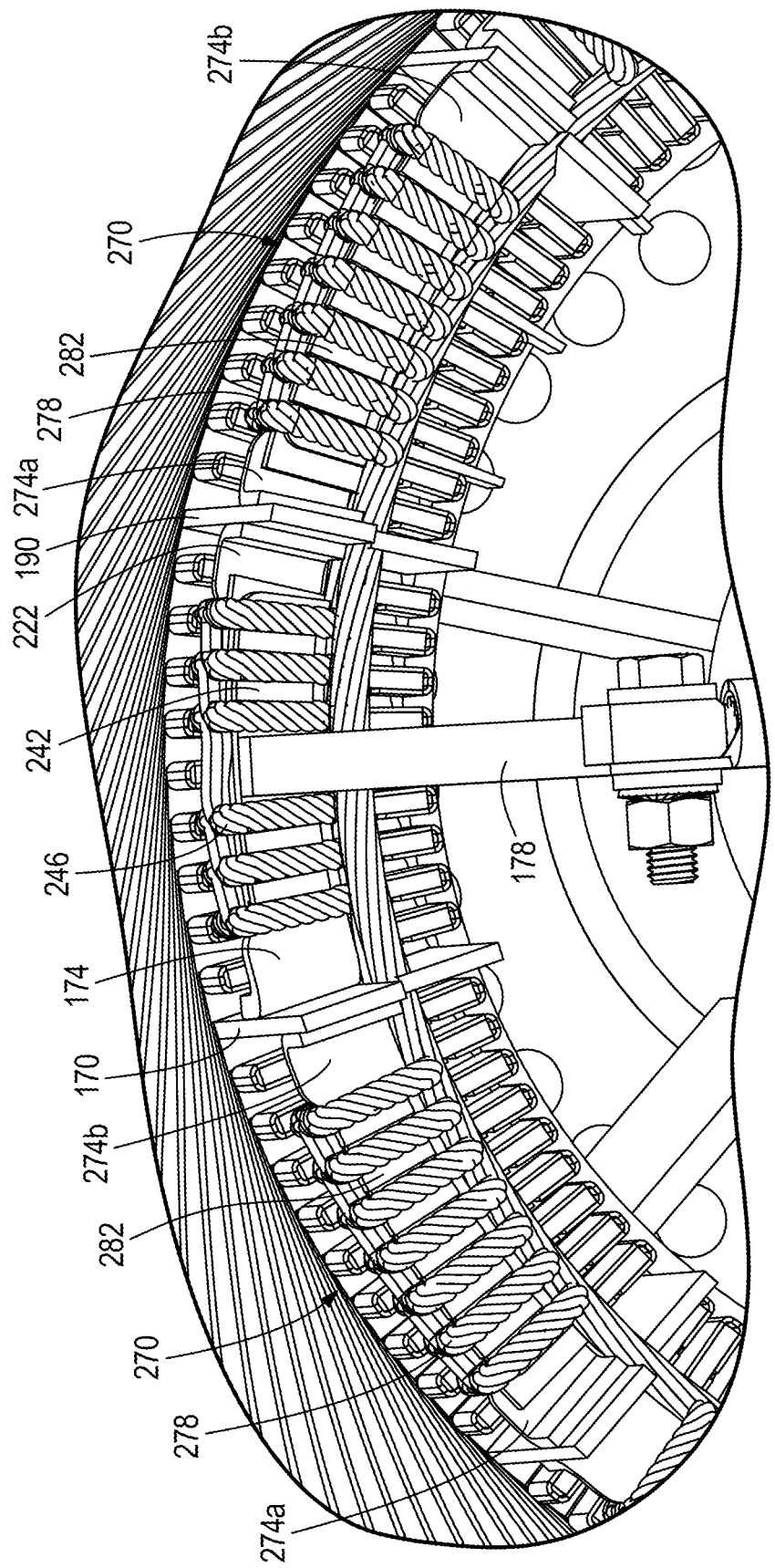
FIG. 18 is a perspective view of the connection end having the L-conductors and L-supports and additional mechanical supports.

FIG. 18 illustrates additional mechanical supports 270 being provided on opposite sides of the line and star coils 170, 190. Additional L-supports 274a, 274b are secured (e.g., brazed, soldered, welded) to the opposing sides of the line and star coils 170, 190 (opposite the sides to which the L-conductor and L-support discussed above are secured) to provide additional mechanical strength and rigidity to the connection. Each of these L-support pairings includes two L-supports 274a, 274b and does not include an L-conductor, as these supports 274a, 274b are not required for any current carrying capabilities. The L-supports 274a, 274b include insulating rope 278 and support blocks 282, utilizing the same connection as described above with respect to the connection between the L-conductor 174 and the L-support 222 shown in FIG. 16.

Figure 19:
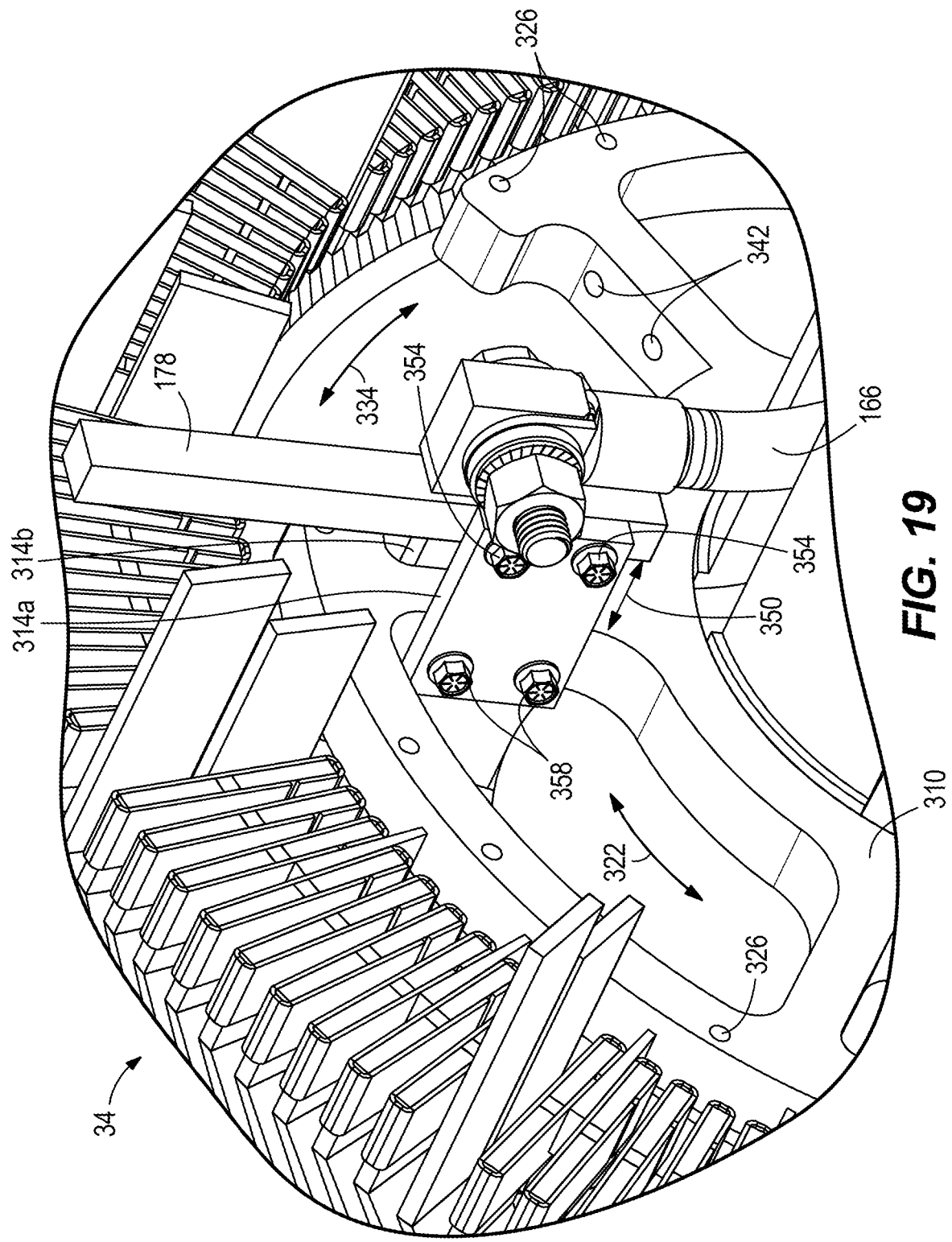
FIG. 19 is a perspective view of the connection end illustrating a connection between the line connector bar and a support ring.

FIG. 19 illustrates that the line connector bar 178 is mechanically supported by a support ring 310. As shown, the connection between the line connector bar 178 and the support ring 310 is an indirect connection, with fish plates 314a, 314b connecting the line connector bar 178 to the support ring 310 (e.g., to a spoke of the support ring extending radially at a common circumferential position with the line connector bar 178).

In order to withstand centrifugal acceleration and deceleration forces, the line connector bar 178 is supported both radially as well as axially by the support ring 310. The support ring 310 is a ring (e.g., a carbon steel ring) positioned adjacent to the coils 42, 46, though having an outer diameter less than the inner diameter of the coils 42, 46 such that the support ring 310 is located radially within the ends of the coils 42, 46. The support ring 310 includes axial cutouts 322 which allow for airflow therethrough for cooling the motor. Axially drilled holes 326 extend through the support ring 310 adjacent to the outer periphery (outside diameter) of the support ring 310, spaced apart from one another about the circumference of the ring 310. The axial holes 326 facilitate the fitment of temporary pins used in the winding process. After the winding process is complete, the holes 326 are used for balancing the rotor 34. To balance the rotor 34, balancing weights are added to the axial holes 326. Pre-drilling the holes 326 before installation facilitates their use for balancing as the assembled support ring 310 lacks the space for drilling the holes 326.

Additionally, the support ring 310 includes a plurality of features for facilitating assembly of the fish plates 314a, 314b to the support ring 310. The support ring 310 includes a peripheral cutout 334 at the outside diameter of the support ring 310. The peripheral cutout 334 provides space for a drill bit to reach the mounting portion for the line connector bar 178 and to facilitate drilling the mounting holes for the fish plates 314a, 314b. Further, the mounting portion for the line connector bar has two slightly oversized holes 342 to allow for alignment of the fish plates 314a, 314b.

The line connector bar 178 is fastened (e.g., bolted) to the support ring 310 via the fish plates 314a, 314b. As shown in FIG. 19, two fish plates 314a, 314b (one on opposing sides of the line connector bar 178) bridge an axial gap 350 between the line connector bar and the support ring 310, with a first plurality of fasteners 354 (e.g., bolts) extending through apertures in the fish plates 314a, 314b and the line connector bar 178 and a second plurality of fasteners 358 (e.g., bolts) extending through apertures in the fish plates 314a, 314b and the support ring 310. The support ring 310 is coupled (e.g., heat shrunk fit) to the shaft of the rotor and is therefore contacting the shaft both electrically and mechanically. It is advantageous for the line connector bar 178 to be electrically insulated from the shaft. As such, the fish plates 314a, 314b are manufactured from a glass mat or laminate saturated and cured with resin (e.g., glass mat with polyester resin, glass laminate with epoxy resin). The fish plates 314a, 314b and connections are repeated for each line coil.

Figure 20:
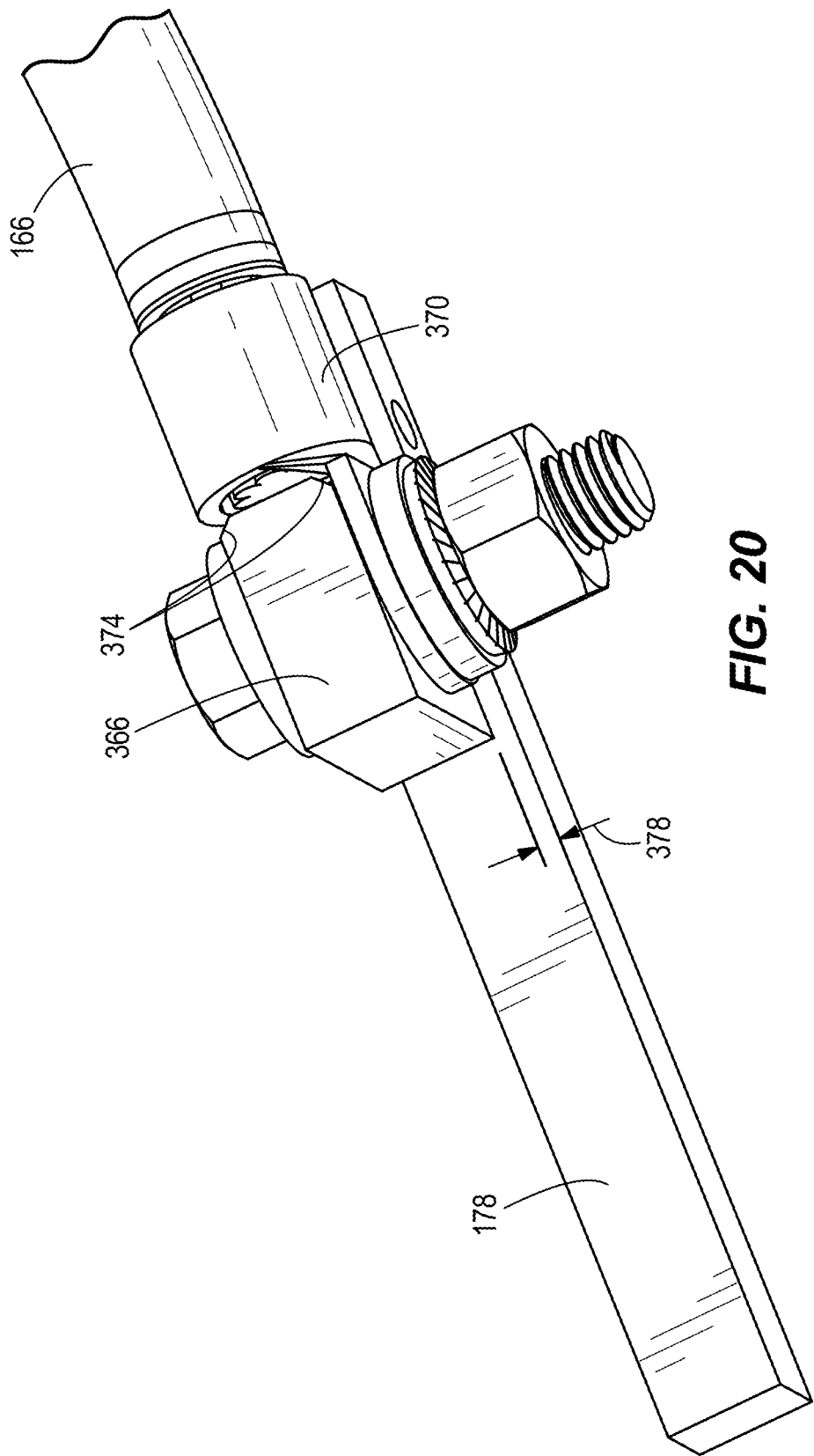
FIG. 20 is a perspective view of the connection between the line connector bar and the rotor lead.

FIG. 20 illustrates that the line connector bar 178 is bolted to the rotor leads 166 by a machined connector block 366. The machined connector block 366 is manufactured from copper or copper alloy (e.g., brass, bronze, chrome copper zirconium (CuCrZr), beryllium copper (CuBe)) and is sized to achieve the required current carrying capacity based on the rotor line current while still fitting onto the line connector bar 178. The machined connector block 366 is secured (e.g., brazed, soldered, welded) to the line connector bar 178. A cable lug 370 is bolted to the machined connector block 366 and the machined connector block 366 is sized large enough to provide this connection. The connector block 366 is mounted at an offset location (off-center circumferentially—see FIG. 19 also) relative to the line connector bar, as shown by distance 378 on FIG. 20. This ensures correct alignment of the rotor leads 166 with the line connector bar 178, reduces bending and stresses on the rotor leads 166, and avoids pinching the rotor leads 166 as they exit the shaft holes. Two chamfered edges 374 on the machined connector block 366 allow for unrestricted fitment of the cable lug 370 and interchangeability of the lead direction.

What is claimed is:

1. A refurbished rotor of a wound rotor induction motor/generator having diamond-shaped rotor windings removed from a rotor core thereof, the refurbished rotor comprising:
   a plurality of windings assembled to the rotor core in a configuration operable in the wound rotor induction motor/generator, each of the plurality of windings manufactured from two separate bars, in particular, a top coil and a bottom coil, the top coil positioned in a rotor core slot at a position radially outward of a position of the bottom coil within another rotor core slot, wherein each top coil and each bottom coil has a flat rectangular cross-section,
   wherein, on a connection end of the rotor where rotor leads are attached, the top coil of each of the plurality of windings has a flat end stacked radially with a flat end of the bottom coil of an adjacent one of the plurality of windings, and a joint is formed therebetween for establishing electrical continuity, and
   wherein, for each of the plurality of windings, the top coil and the bottom coil have respective flat ends stacked radially and joined to each other on a non-connection end of the rotor opposite the connection end by a joint for establishing electrical continuity.

2. The refurbished rotor of claim 1, wherein, at the connection end, the top coil flat end is positioned co-planar with and in radial alignment with the flat end of the bottom coil of the adjacent one of the plurality of windings.

3. The refurbished rotor of claim 2, wherein, at the non-connection end, the top coil and the bottom coil have their respective flat ends positioned co-planar and in radial alignment.

4. The refurbished rotor of claim 1, wherein, for each of the plurality of windings, the joint between the respective flat ends of the top coil and the bottom coil on the non-connection end is a weld, a braze joint, or a solder joint, and the joint between the respective flat ends of the top coil of the winding and the bottom coil of the adjacent winding on the connection end is a weld, a braze joint, or a solder joint.

5. The refurbished rotor of claim 1, further comprising extended spacer blocks positioned between adjacent pairs of bottom coils at the connection end, each of the extended spacer blocks having a tapered shape and having a portion extending radially inwardly of the bottom coils.

6. The refurbished rotor of claim 5, wherein the wound rotor motor/generator is configured as a 3 MW generator, and the number of extended spacer blocks is selected so that a spacing distance between adjacent extended spacer blocks is less than or equal to 2 inches.

7. The refurbished rotor of claim 5, further comprising glass fiber insulating rope situated axially between the radially inwardly extending portions of the extended spacer blocks and a first cross connection assembly, the glass fiber insulating rope being oversized and compressed into an available space between the radially inwardly extending portions of the extended spacer blocks and the first cross connection assembly.

8. The refurbished rotor of claim 7, further comprising:
additional glass fiber insulating rope situated axially between the first cross connection assembly and a second cross connection assembly and abutting a radially inner side of the bottom coils, the additional glass fiber insulating rope being oversized and compressed into an available space between the first cross connection assembly and the second cross connection assembly;
additional glass fiber insulating rope situated radially between the second cross connection assembly and the radially inner side of the bottom coils, the additional glass fiber insulating rope being oversized and compressed into an available space between the second cross connection assembly and the radially inner side of the bottom coils;
additional glass fiber insulating rope situated radially between the top and bottom coils and axially between a star connection assembly and a connection clip through which the top and bottom coils extend, the additional glass fiber insulating rope being oversized and compressed into an available space between the top coils, the bottom coils, the star connection assembly, and the connection clip; and
additional glass fiber insulating rope situated radially between the star connection assembly and a radially inner side of the top coils, the additional glass fiber insulating rope being oversized and compressed into an available space between the star connection assembly and the radially inner side of the top coils.

9. A refurbished rotor of a wound rotor motor/generator having diamond-shaped rotor windings removed from a rotor core thereof, the refurbished rotor comprising:
a plurality of windings assembled to the rotor core, each of the plurality of windings manufactured from two separate bars, in particular, a top coil and a bottom coil, the top coil positioned in a rotor core slot at a position radially outward of a position of the bottom coil within another rotor core slot, wherein each top coil and each bottom coil has a flat rectangular cross-section,
wherein, on a connection end of the rotor where rotor leads are attached, the top coil of each of the plurality of windings has a flat end positioned alongside and in alignment with a flat end of the bottom coil of an adjacent one of the plurality of windings, and a joint is formed therebetween for establishing electrical continuity, and
wherein, for each of the plurality of windings, the top coil and the bottom coil have respective flat ends joined to each other on a non-connection end of the rotor opposite the connection end by a joint for establishing electrical continuity,
the refurbished rotor further comprising
extended spacer blocks positioned between adjacent pairs of bottom coils at the connection end, each of the extended spacer blocks having a tapered shape and having a portion extending radially inwardly of the bottom coils; and
glass fiber insulating rope situated axially between the radially inwardly extending portions of the extended spacer blocks and a first cross connection assembly, the glass fiber insulating rope being oversized and compressed into an available space between the radially inwardly extending portions of the extended spacer blocks and the first cross connection assembly.

\* \* \* \* \*